US008750463B2

(12) United States Patent
Doulton

(10) Patent No.: US 8,750,463 B2
(45) Date of Patent: Jun. 10, 2014

(54) MASS-SCALE, USER-INDEPENDENT, DEVICE-INDEPENDENT VOICE MESSAGING SYSTEM

(75) Inventor: Daniel Michael Doulton, Buckinghamshire (GB)

(73) Assignee: Nuance Communications, Inc., Burlington, MA (US)

( * ) Notice: Subject to any disclaimer, the term of this patent is extended or adjusted under 35 U.S.C. 154(b) by 1255 days.

(21) Appl. No.: 11/931,038

(22) Filed: Oct. 31, 2007

(65) Prior Publication Data

US 2008/0049907 A1 Feb. 28, 2008

Related U.S. Application Data

(62) Division of application No. 11/673,746, filed on Feb. 12, 2007.

(30) Foreign Application Priority Data

Feb. 10, 2006 (GB) .................................. 0602682.7
Jan. 9, 2007 (GB) .................................. 0700376.7
Jan. 9, 2007 (GB) .................................. 0700377.5

(51) Int. Cl.
*H04M 1/64* (2006.01)

(52) U.S. Cl.
USPC .......... 379/88.01; 379/88.22; 704/9; 704/231

(58) Field of Classification Search
USPC ............. 704/231, 215, 9, 10, 235; 369/25.01; 379/88.01, 88.22
See application file for complete search history.

(56) References Cited

U.S. PATENT DOCUMENTS 5,121,421 A 6/1992 Alheim
5,163,081 A 11/1992 Wycherley et al.
5,557,639 A 9/1996 Heikkila et al.
5,712,901 A 1/1998 Meermans
5,729,741 A 3/1998 Liaguno et al.
5,805,771 A 9/1998 Muthusamy et al.
5,867,562 A 2/1999 Scherer (Continued)

FOREIGN PATENT DOCUMENTS

EP 0 876 043 A2 11/1998
EP 0 917 038 A2 5/1999

(Continued)

OTHER PUBLICATIONS

International Search Report for International Application No. PCT/GB2007/000483 mailed May 25, 2007.

(Continued)

*Primary Examiner* — Fan Tsang
*Assistant Examiner* — Simon King
(74) *Attorney, Agent, or Firm* — Wolf, Greenfield & Sacks, P.C.

(57) ABSTRACT

A mass-scale, user-independent, device-independent, voice messaging system that converts unstructured voice messages into text for display on a screen is disclosed. The system comprises (i) computer implemented sub-systems and also (ii) a network connection to human operators providing transcription and quality control; the system being adapted to optimise the effectiveness of the human operators by further comprising 3 core sub-systems, namely (i) a pre-processing front end that determines an appropriate conversion strategy; (ii) one or more conversion resources; and (iii) a quality control sub-system.

17 Claims, 4 Drawing Sheets

(56) References Cited

U.S. PATENT DOCUMENTS

| | | | |
|---|---|---|---|
| 5,940,794 A * | 8/1999 | Abe | 704/253 |
| 6,236,717 B1 | 5/2001 | Bremer et al. | |
| 6,240,170 B1 | 5/2001 | Shaffer et al. | |
| 6,289,085 B1 | 9/2001 | Miyashita et al. | |
| 6,385,306 B1 | 5/2002 | Baxter, Jr. | |
| 6,408,176 B1 | 6/2002 | Urs | |
| 6,449,342 B1 | 9/2002 | Johanson | |
| 6,507,643 B1 | 1/2003 | Groner | |
| 6,507,735 B1 | 1/2003 | Baker et al. | |
| 6,513,003 B1 | 1/2003 | Angell et al. | |
| 6,535,849 B1 | 3/2003 | Pakhomov et al. | |
| 6,567,506 B1 | 5/2003 | Kermani | |
| 6,570,964 B1 | 5/2003 | Murveit et al. | |
| 6,606,373 B1 | 8/2003 | Martin | |
| 6,687,339 B2 | 2/2004 | Martin | |
| 6,724,864 B1 | 4/2004 | Denenberg et al. | |
| 6,873,687 B2 | 3/2005 | Smith, II | |
| 6,987,840 B1 | 1/2006 | Bosik et al. | |
| 7,013,155 B1 | 3/2006 | Ruf et al. | |
| 7,190,950 B1 | 3/2007 | Baker et al. | |
| 7,451,082 B2 | 11/2008 | Gong et al. | |
| 7,502,731 B2 | 3/2009 | Emonts et al. | |
| 7,873,519 B2 * | 1/2011 | Bennett | 704/257 |
| 8,374,863 B2 | 2/2013 | Doulton | |
| 8,509,825 B2 | 8/2013 | Doulton | |
| 2002/0067808 A1 | 6/2002 | Agraharam et al. | |
| 2002/0087569 A1 | 7/2002 | Fischer et al. | |
| 2002/0131566 A1 | 9/2002 | Stark et al. | |
| 2002/0152071 A1 | 10/2002 | Chaiken et al. | |
| 2002/0161579 A1 | 10/2002 | Saindon et al. | |
| 2002/0188467 A1 | 12/2002 | Eke | |
| 2003/0028602 A1 | 2/2003 | Bhattacharya | |
| 2003/0033294 A1 | 2/2003 | Walker et al. | |
| 2003/0134648 A1 | 7/2003 | Reed et al. | |
| 2004/0252679 A1 | 12/2004 | Williams et al. | |
| 2005/0010407 A1 | 1/2005 | Jaroker | |
| 2005/0047561 A1 | 3/2005 | Seiferth | |
| 2005/0053201 A1 | 3/2005 | Bhargava et al. | |
| 2005/0060088 A1 | 3/2005 | Helal et al. | |
| 2005/0114129 A1 | 5/2005 | Watson et al. | |
| 2005/0131676 A1 | 6/2005 | Ghasemi et al. | |
| 2005/0131884 A1 | 6/2005 | Ghasemi et al. | |
| 2005/0176451 A1 | 8/2005 | Helferich | |
| 2005/0195798 A1 | 9/2005 | Kirkland et al. | |
| 2005/0232402 A1 | 10/2005 | Greve | |
| 2005/0238148 A1 | 10/2005 | Poustchi et al. | |
| 2006/0026003 A1 | 2/2006 | Carus et al. | |
| 2006/0058049 A1 | 3/2006 | McLaughlin et al. | |
| 2006/0128409 A1 | 6/2006 | Gress et al. | |
| 2006/0136375 A1 | 6/2006 | Cox et al. | |
| 2006/0193450 A1 | 8/2006 | Flynt et al. | |
| 2006/0217978 A1 | 9/2006 | Mitby et al. | |
| 2006/0223502 A1 | 10/2006 | Doulton | |
| 2007/0047702 A1 | 3/2007 | Newell et al. | |
| 2007/0116204 A1 | 5/2007 | Doulton | |
| 2007/0117543 A1 | 5/2007 | Doulton | |
| 2007/0117544 A1 | 5/2007 | Doulton | |
| 2007/0117545 A1 | 5/2007 | Doulton | |
| 2007/0117546 A1 | 5/2007 | Doulton | |
| 2007/0117547 A1 | 5/2007 | Doulton | |
| 2007/0127638 A1 | 6/2007 | Doulton | |
| 2007/0127688 A1 | 6/2007 | Doulton | |
| 2007/0177717 A1 | 8/2007 | Owens et al. | |
| 2007/0219978 A1 | 9/2007 | Myers | |
| 2007/0260454 A1 | 11/2007 | Gemello et al. | |
| 2008/0049906 A1 | 2/2008 | Doulton | |
| 2008/0052070 A1 | 2/2008 | Doulton | |
| 2008/0063155 A1 | 3/2008 | Doulton | |
| 2008/0109221 A1 | 5/2008 | Doulton | |
| 2008/0133219 A1 | 6/2008 | Doulton | |
| 2008/0133231 A1 | 6/2008 | Doulton | |
| 2008/0133232 A1 | 6/2008 | Doulton | |
| 2008/0162132 A1 | 7/2008 | Doulton | |
| 2008/0205605 A1 | 8/2008 | Gao et al. | |
| 2009/0292539 A1 * | 11/2009 | Jaroker | 704/235 |
| 2010/0094657 A1 | 4/2010 | Stern et al. | |
| 2010/0119045 A1 | 5/2010 | Caputo et al. | |
| 2012/0202535 A1 | 8/2012 | Chaddha et al. | |
| 2013/0165086 A1 | 6/2013 | Doulton | |

FOREIGN PATENT DOCUMENTS

| | | | |
|---|---|---|---|
| EP | 1 139 677 | A2 | 10/2001 |
| GB | 2 323 693 | A | 9/1998 |
| GB | 2 334 404 | A | 8/1999 |
| GB | 2364850 | A | 2/2002 |
| GB | 2 420 942 | A | 6/2006 |
| JP | 09-321914 | A | 12/1997 |
| JP | 2002-368885 | A | 12/2002 |
| WO | WO 98/05154 | A1 | 2/1998 |
| WO | WO 99/56275 | A1 | 11/1999 |
| WO | WO 01/69905 | A1 | 9/2001 |
| WO | WO 02/23872 | A1 | 3/2002 |
| WO | WO 02/061730 | A1 | 8/2002 |
| WO | WO 03/023766 | A2 | 3/2003 |
| WO | WO 2004/095821 | A2 | 11/2004 |
| WO | WO 2005/114656 | A2 | 12/2005 |

OTHER PUBLICATIONS

Extended European Search Report and search opinion for European patent application No. EP 12 17 5603 dated Oct. 4, 2012.

European Search Report and search opinion for European patent application No. EP 12 17 5598 dated Oct. 4, 2012.

European Search Report and search opinion for European patent application No. 12 1 75610 dated Oct. 11, 2012.

Extended European Search Report dated Oct. 21, 2011 for European Application No. 11 151 739.7.

UK Combined Search and Examination Report Under Sections 17 & 18(3) dated Oct. 29, 2004 for GB0408988.4 (N0484.70928GB00).

International Search Report and International Preliminary Report on Patentability for PCT/GB2004/001805 dated Mar. 10, 2005 and Aug. 17, 2005 respectively.

International Preliminary Report on Patentability and Written Opinion mailed Aug. 12, 2008 for International Application No. PCT/GB2007/000483.

International Preliminary Report on Patentability dated Jul. 14, 2009 for International Application No. PCT/GB2008/000047.

Belkin et al., Translating Voice Mail to Text for Short Message Delivery. IP.com J. May 15, 2002.

Koumpis et al., An Advanced Integrated Architecture for Wireless Voicemail Data Retrieval. Proc Intl Conf Info Netw. Jan. 31, 2001; 403-10.

User's Guide: Nokia 3330. Nokia Mobile Phones. 9353142, Issue 2. Copyright 2001. <http://nds1.nokia.com/phones/files/guides/3330_usersguide_en.pdf>.

* cited by examiner

Figure 3

*Correct:* hi jonathan i will be in the stag and hounds at seven forty see you soon andy

*Display:* |hi john it's tam i will be into stagecoach after four to meet you soon amy

*Input:* <*accept_word*>

*D:* hi| john it's tam i will be into stagecoach after four to meet you soon amy

*Input:* 3 * <*accept_char*>

*D:* hi jo|hn it's tam i will be into stagecoach after four to meet you soon amy

*Input:* n

*D:* hi jon|athan i will be into stagecoach after four to meet you soon amy

*Input:* 4 * <*accept_word*> 3 * <*accept_char*>

*D:* hi jonathan i will be in|to stagecoach after four to meet you soon amy

*Input:* <*space*>

*D:* hi jonathan i will be in |the stadium from after four to meet you soon amy

*Input:* <*accept_word*> 4 * <*accept_char*>

*D:* hi jonathan i will be in the sta|dium from after four to meet you soon amy

*Input:* g

*D:* hi jonathan i will be in the stag|ecoach after four to meet you soon amy

*Input:* ' '

*D:* hi jonathan i will be in the stag |and hounds after four to meet you soon amy

*Input:* 3 * <*accept_word*> 2 * <*accept_char*>

*D:* hi jonathan i will be in the stag and hounds a|fter four to meet you soon amy

*Input:* t

*D:* hi jonathan i will be in the stag and hounds at| seven forty see you soon amy

*Input:* 6 * <*accept_word*> 2 * <*accept_char*>

*D:* hi jonathan i will be in the stag and hounds at seven forty see you soon a|my

*Input:* n

*D:* hi jonathan i will be in the stag and hounds at seven fourty see you soon a|ndy

*Input:* <*accept_utterance*>

Figure 4

*Display:* |HEY john it's tam i will be into stagecoach after four to SOON amy

MASS-SCALE, USER-INDEPENDENT, DEVICE-INDEPENDENT VOICE MESSAGING SYSTEM

CROSS-REFERENCE TO RELATED APPLICATIONS

This application is a divisional of U.S. application Ser. No. 11/673,746, filed Feb. 12, 2007, which is based on and claims priority to Great Britain Application No. GB 0602682.7, filed Feb. 10, 2006, Great Britain Application No. GB 0700376.7, filed Jan. 9, 2007, and Great Britain Application No. GB0700377.5, filed Jan. 9, 2007, the contents of which are fully incorporated herein by reference.

BACKGROUND OF THE INVENTION

1. Field of the Invention

This invention relates to a mass-scale, user-independent, device-independent, voice messaging system that converts unstructured voice messages into text for display on a screen. It is worthwhile initially looking at the challenges facing a mass-scale, user-independent, voice messaging system that can convert unstructured voice messages into text. First, 'mass-scale'—means that the system should be scalable to very large numbers, for example 500,000+ subscribers (typically these are subscribers to a mobile telephone operator) and still allow effective and fast processing times—a message is generally only useful if received within 2-5 minutes of being left. This is far more demanding than most ASR implementations. Second, 'user-independent': this means that there is absolutely no need for a user to train the system to recognise its voice or speech patterns (unlike conventional voice dictation systems). Third, 'device-independent': this means that the system is not tied to receiving inputs from a particular input device; some prior art systems require input from say a touch tone telephone. Fourth, 'unstructured': this means that messages have no pre-defined structure, unlike response to voice prompts. Fifth, 'voice messages': this is a very specific and quite narrow application field that raises different challenges to those faced by many conventional automated speech recognition (ASR) systems. For example, voice mail messages for a mobile telephone frequently includes hesitations, 'ers' and 'ums'. A conventional ASR approach would be to faithfully convert all utterances, even meaningless sounds. The mindset of accurate or verbose transcription characterises the approach of most workers in the ASR field. But it is in fact not appropriate at all for the voice messaging domain. In the voice messaging domain, the challenge is not accurate, verbose transcription at all, but instead capturing meaning in the most helpful manner for the intended recipient(s).

Only by successfully addressing all five of these requirements is it possible to have a successful implementation.

2. Description of the Prior Art

Conversion from speech-to-text (STT) uses automatic speech recognition (ASR) and has, up until now, been applied mainly to dictation and command tasks. The use of ASR technology to convert voicemail to text is a novel application with several characteristics that are task specific. Reference may be made to WO 2004/095821 (the contents of which are incorporated by reference) which discloses a voice mail system from Spinvox Limited that allows voicemail for a mobile telephone to be converted to SMS text and sent to the mobile telephone. Managing voicemail in text form is an attractive option. It is usually faster to read than to listen to messages and, once in text form, voicemail messages can be stored and searched as easily as email or SMS text. In one implementation, subscribers to the SpinVox service divert their voicemail to a dedicated SpinVox phone number. Callers leave voicemail messages as usual for the subscriber. SpinVox then converts the messages from voice to text, aiming to capture the full meaning as well as stylistic and idiomatic elements of the message but without necessarily converting it word-for-word. Conversion is done with a significant level of human input. The text is then sent to the subscriber either as SMS text or email. As a result, subscribers can manage voicemail as easily and quickly as text and email messages and can use client applications to integrate their voicemail—now in searchable and archivable text form—with their other messages.

The problem with transcription systems that are significantly human based however is that they can be costly and difficult to scale to the mass-market—e.g. to a user base of 500,000+ or more. Consequently, it is impractical for major mobile or cell phone operators to offer them to their subscriber base because for the required fast response times it is just too expensive to have human operators listening to and transcribing the entirety of every message; the cost per message transcribed would be prohibitively high. The fundamental technical problem therefore is to design an IT-based system that enables the human transcriptionist to operate very efficiently.

WO 2004/095821 envisaged some degree of ASR front-end processing combined with human operators: in essence it was a hybrid system; the present invention develops this and defines specific tasks that the IT system can do that greatly increase the efficiency of the entire system.

Hybrid systems are known in other contexts, but the conventional approach to voice conversion is to eliminate the human element entirely; this is the mindset of those skilled in the ASR arts, especially the STT arts. We will therefore consider now some of the technical background to STT.

The core technology of speech-to-text (STT) is classification. Classification aims to determine to which 'class' some given data belongs. Maximum likelihood estimation (MLE), like many statistical tools, makes use of an underlying model of the data-generating process—be it the toss of a coin or human speech production system. The parameters of the underlying model are estimated so as to maximize the probability that the model generated the data. Classification decisions are then made by comparing features obtained from the test data with model parameters obtained from training data for each class. The test data is then classified as belonging to the class with the best match. The likelihood function describes how the probability of observing the data varies with the parameters of the model. The maximum likelihood can be found from the turning points in the likelihood function if the function and its derivatives are available or can be estimated. Methods for maximum likelihood estimation include simple gradient descent as well as faster Gauss-Newton methods. However, if the likelihood function and its derivatives are not available, algorithms based on the principles of Expectation-Maximization (EM) can be employed which, starting from an initial estimate, converge to a local maximum of the likelihood function of the observed data.

In the case of STT, supervised classification is used in which the classes are defined by training data most commonly as triphone units, meaning a particular phoneme spoken in the context of the preceding and following phoneme. (Unsupervised classification, in which the classes are deduced by the classifier, can be thought of as clustering of the data.) Classification in STT is required not only to determine which triphone class each sound in the speech signal belongs to but, very importantly, what sequence of triphones is most likely.

This is usually achieved by modelling speech with a hidden Markov model (HMM) which represents the way in which the features of speech vary with time. The parameters of the HMM can be found using the Baum-Welch algorithm which is a form of EM.

The classification task addressed by the SpinVox system can be stated in a simplified form as: "Of all the possible strings of text that could be used to represent the message, which string is the most likely given the recorded voicemail speech signal and the properties of language used in voicemail?" It is immediately clear that this is a classification problem of enormous dimension and complexity.

Automatic speech recognition (ASR) engines have been under development for more than twenty years in research laboratories around the world. In the recent past, the driving applications for continuous speech, wide vocabulary ASR have included dictation systems and call centre automation of which "Naturally Speaking" (Nuance) and "How May I Help You" (AT&T) are important examples. It has become clear that successful deployment of voice-based systems depends as heavily on system design as it does on ASR performance and, possibly because of this factor, ASR-based systems have not yet been taken up by the majority of IT and telecommunications users.

ASR engines have three main elements. 1. Feature extraction is performed on the input speech signal about every 20 ms to extract a representation of the speech that is compact and as free as possible of artefacts including phase distortion and handset variations. Mel-frequency cepstral coefficients are often chosen and it is known that linear transformations can be performed on the coefficients prior to recognition in order to improve their capability for discrimination between the various sounds of speech. 2. ASR engines employ a set of models, often based on triphone units, representing all the various speech sounds and their preceding and following transitions. The parameters of these models are learnt by the system prior to deployment using appropriate training examples of speech. The training procedure estimates the probability of occurrence of each sound, the probability of all possible transitions and a set of grammar rules that constrain the word sequence and sentence structure of the ASR output. 3. ASR engines use a pattern classifier to determine the most probable text given the input speech signal. Hidden Markov model classifiers are often preferred since they can classify a sequence of sounds independently of the rate of speaking and have a structure well suited to speech modelling.

An ASR engine outputs the most likely text in the sense that the match between the features of the input speech and the corresponding models is optimized. In addition, however, ASR must also take into account the likelihood of occurrence of the recognizer output text in the target language. As a simple example, "see you at the cinema at eight" is a much more likely text than "see you at the cinema add eight", although analysis of the speech waveform would more likely detect 'add' than 'at' in common English usage. The study of the statistics of occurrence of elements of language is referred to as language modelling. It is common in ASR to use both acoustic modelling, referring to analysis of the speech waveform, as well as language modelling to improve significantly the recognition performance.

The simplest language model is a unigram model which contains the frequency of occurrence of each word in the vocabulary. Such a model would be built by analysing extensive texts to estimate the likelihood of occurrence of each word. More sophisticated modelling employs n-gram models that contain the frequency of occurrence of strings of n elements in length. It is common to use n=2 (bigram) or n=3 (trigram). Such language models are substantially more computationally expensive but are able to capture language usage much more specifically than unigram models. For example, bigram word models are able to indicate a high likelihood that 'degrees' will be followed by 'centigrade' or 'Fahrenheit' and a low likelihood that it is followed by 'centipede' or 'foreigner'. Research on language modelling is underway worldwide. Issues include improvement of the intrinsic quality of the models, introduction of syntactic structural constraints into the models and the development of computationally efficient ways to adapt language models to different languages and accents.

The best wide vocabulary speaker independent continuous speech ASR systems claim recognition rates above 95%, meaning less than one word error in twenty. However, this error rate is much too high to win the user confidence necessary for large scale take up of the technology. Furthermore, ASR performance falls drastically when the speech contains noise or if the characteristics of the speech do not match well with the characteristics of the data used to train the recognizer models. Specialized or colloquial vocabulary is also not well recognized without additional training.

To build and deploy successful ASR-based voice systems clearly requires specific optimization of the technology to the application and added reliability and robustness obtained at the system level.

To date, no-one has fully explored the practical design requirements for a mass-scale, user-independent, hybrid voice messaging system that can convert unstructured voice messages into text. Key applications are for converting voicemail sent to a mobile telephone to text and email; other applications where a user wishes to speak a message instead of typing it out on a keyboard (of any format) are also possible, such as instant messaging, where a user speaks a response that it captured as part of an IM thread; speak-a-text, where a user speaks a message that he intends to be sent as a text message, whether as an originating communication, or a response to a voice message or a text or some other communication; speak-a-blog, where a user speaks the words he wishes to appear on a blog and those words are then converted to text and added to the blog. In fact, wherever there is a requirement, or potential benefit to be gained from, enabling a user to speak a message instead of having to directly input that message as text, and having that message converted to text and appear on screen, then mass-scale, user-independent, hybrid voice messaging systems of the kind described in the present specification may be used.

SUMMARY OF THE INVENTION

The invention is a mass-scale, user-independent, device-independent, voice messaging system that converts unstructured voice messages into text for display on a screen; the system comprising (i) computer implemented sub-systems and also (ii) a network connection to human operators providing transcription and quality control; the system being adapted to optimise the effectiveness of the human operators by further comprising:

3 core sub-systems, namely (i) a pre-processing front end that determines an appropriate conversion strategy; (ii) one or more conversion resources; and (iii) a quality control sub-system.

Further aspects are given in Appendix III. The invention is a contribution to the field of designing a mass-scale, user-independent, device-independent, voice messaging system that converts unstructured voice messages into text for display on a screen. As explained earlier, this field presents many different challenges to the system designer compared to other areas in which ASR has in the past been deployed.

BRIEF DESCRIPTION OF THE DRAWINGS

The invention will be described with reference to the accompanying Figures, in which

FIGS. 3 and 4 are examples of how the system presents possible word and phrase choices to a human operator to accept or refine.

DETAILED DESCRIPTION

The SpinVox system designers faced many challenges:

Automatic Speech Recognition and Language Models

First and foremost, it was clear to the designers that established ASR technology on its own was not sufficient to provide reliable STT for voicemail (and other mass-scale, user-independent voice messaging applications). ASR relies on assumptions built from theoretical models of speech and language including, for example, language models containing word prior probabilities and grammar rules. Many, if not all, of these assumptions and rules are invalid in general for voicemail speech. Factors found in the voicemail STT application that are beyond the capabilities of standard ASR technology include:

- voice quality is subject to environmental noise, handset and codec variation, network artefacts including noise and drop-outs;
- users do not know they are talking to an ASR system and are comfortable leaving a message using natural and sometimes ill-structured language;
- the language itself and accent used in the voicemail are not constrained or predictable;
- vocabulary variations occur rapidly even within the same language so that, for example, the language statistics may vary because of major current affairs events.

IT Infrastructure

The design of the IT infrastructure to maintain availability and quality of the SpinVox service makes exacting demands on computational power, network and storage bandwidth and server availability. Loading on the SpinVox system is subject to unpredictable peaks as well as more predictable cyclic variations.

Unconvertible Messages

It is to be expected that a fraction of messages are unconvertible. These might be empty messages, such as 'slam-downs', messages in an unsupported language or unintentionally dialled calls.

Quality Assessment

The assessment of quality at each stage of the SpinVox system is in itself a challenge. Signal processing provides numerous analysis techniques that can be applied to the speech signal, ranging for straightforward SNR measurement to more sophisticated techniques including the explicit detection of common artefacts. However, direct measurements such as these are not significant in themselves but need to be assessed in terms of their impact on the later conversion process. Likewise, ASR confidence can be measured in terms of the output probability of alternative recognition hypotheses but, as before, it is important to measure the quality in terms of impact on the overall text conversion and the complexity of the quality control needed to reach it.

User Experience and Human Factors

The value of the system to customers is influenced heavily by the level of success with which human factors are accommodated by the design. Users will quickly lose confidence in the system if they receive garbled messages or find the system other than transparent and very simple to use.

The above challenges have been met in the SpinVox system design as follows:

System Design

Figure 1:
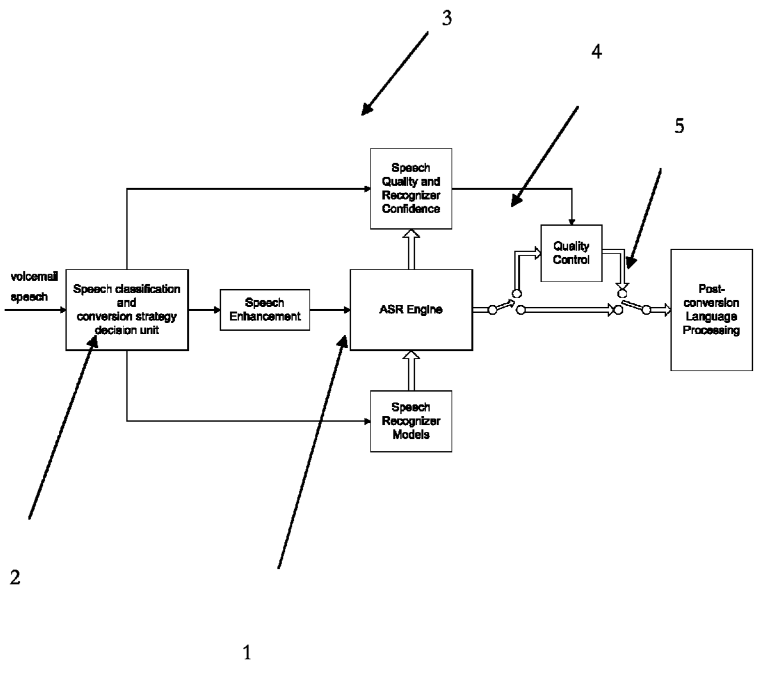
FIGS. 1 and 2 are schematic views of a mass-scale, user-independent, device-independent, voice messaging system that converts unstructured voice messages into text for display on a screen, as defined by this invention.

A simplified block diagram of the SpinVox system design in FIG. 1 shows the major functional units. At the core is the ASR engine 1. SpinVox draws a clear distinction between ASR and a full STT conversion. ASR 1 is a subsystem which generates 'raw' text, given the input speech signal. This is a key element used for STT conversion, but is only one of several important subsystems that are needed to achieve reliable STT conversion. The front-end pre-processing subsystem 2 can perform broad classification of the speech signal which can be used to determine the conversion strategy in terms of the choice of a combination of ASR engine, model set and speech enhancement processing. The quality assessment subsystem 3 measures the quality of the input speech and the ASR confidence from which a quality control strategy can be determined. The quality control subsystem 4 operates on the ASR output. Its purpose is to generate semantically correct, meaningful and idiomatic text to represent the message within the constraints of the text format. Knowledge of context, including the caller ID, the recipient and caller-specific language models built up over time can be used to improve the quality of conversion substantially compared to the raw ASR output. The converted text is finally output from post conversion language processing sub-system 5 to an SMS text and email gateway.

Key Features

The main features of the approach adopted by SpinVox are:

Meaningful Message Conversion

The text conversion captures the message—its meaning, style and idioms—but is not necessarily a word-for-word conversion of the voicemail.

Turn-Around Time

The turn-around time for conversion of a message is guaranteed.

Reliability

The system can never send a garbled text message. Subscribers are alerted to unconvertible messages which can be listened to in the conventional way.

Standard Language

Messages are sent in standard language and are not 'textified'.

Wide Availability

The system operates entirely in the infrastructure and makes no requirements on the handset or network other than call divert.

Adaptive Operation

The system can optimize performance using embedded quality control strategies driven by knowledge built up over time from language modelling of voicemail in general as well as caller-specific language modelling. In addition, the system can choose from a number of possible speech-to-text conversion strategies based on the characteristics of the voicemail message. Voicemail message data and corresponding text conversions are continuously analysed so as to update and adapt the SpinVox STT system.

Quality Monitoring

The quality of speech-to-text conversion can be monitored at each stage and so quality control, whether by human or automatic agents, can be undertaken efficiently.

Language Processing

Post-conversion language processing 5 can be performed to enhance the quality of the converted message text, remove obvious redundancies and validate elements of the message such as commonly used salutation structures.

State-of-the-Art ASR

Commercial ASR engines can be used so as to take competitive advantage of state-of-the-art ASR technology. Different ASR engines can be called on to handle different messages or even different parts of the same message (with the decision unit 2 decided on which engine to use). The human operators themselves could also be considered as an instance of an ASR engine, suitable for some tasks but not others.

Stable and Secure

The service is run on highly stable and secure Unix servers and can adapt to the demand for various languages as different time-zones experience peaks spread throughout each 24 hour period.

Quality Control

SpinVox have developed a detailed understanding of users' expectations and desires for telephony-based messaging systems. They have identified zero-tolerance of users to nonsensical speech-to-text conversion, particularly where there is evidence that the errors have been introduced by a machine rather than by human error. Quality control of the converted text is therefore of key importance. Three alternative quality strategies can be used; decision unit 2 selects the optimal one. (i) Messages for which the ASR conversion confidence is sufficiently high can be checked automatically by quality assessment sub-system 3 for conformance to quality standards. (ii) Messages for which the ASR conversion confidence is not sufficiently high can be routed to a human agent 4 for checking and, if necessary, correction. (iii) Messages for which the ASR conversion confidence is very low are flagged as unconvertible and the user is informed of the receipt of an unconvertible message. Unconvertible messages can be listened to by the user, if they wish, using a single key-press. The outcome of these strategies is that the SpinVox system is designed so that a failure to convert is favoured over generating a conversion containing errors. User confidence in the system is therefore protected. SpinVox's statistics indicate that a substantial percentage of voicemails are successfully converted.

One of the important tools used by SpinVox for improving the quality of converted messages is knowledge of the language (common phrases, common greetings and sign-offs etc) used in voicemail messages. From accumulated data gathered over time, statistical language models specific to voicemail speech can be developed and then used to guide the STT conversion process. This greatly improves accuracy of conversion for non-standard language constructions.

The most apparent feature of SpinVox is that it supplies a service that many users did not realize they needed but soon find they cannot manage without. It is the first real-time system that provides speech-to-text conversation of voicemails. Its impact for network operators is increased network traffic, from improved call continuity, both for voice and data. The operational success of the SpinVox system has been achieved by taking a design approach that is driven by quality-of-service first, and technology second. The system design is based on a detailed understanding of customer expectations of the service and, even more importantly from an engineering perspective, the strengths and weaknesses of ASR technology. By exploiting the strengths of ASR and factoring out the weaknesses by stringent quality control, SpinVox is an effective deployment that meets the practical design requirements for a mass-scale, user-independent, hybrid unstructured voice messaging system.

SpinVox have demonstrated success in delivering a voice-processing-based service by focusing its conversion technology on a very specific target application—voicemail conversion. The indication is that system design targeted to a very well defined application is a more productive approach than the seemingly endless search for ever decreasing improvements in raw performance measures of, for example, ASR engines. This approach opens up the possibility of new application areas into which SpinVox's technology components and system design know-how could be deployed.

SpinVox has developed significant know-how as system architects for voice-based applications with in-house expertise covering speech recognition, telecoms applications, cellular networks and human factors. The opportunities for growth and development in advanced messaging technologies are likely to point to enabling the integration of voice and text messaging, thereby facilitating search, management and archiving of voicemail with all the same advantages currently enjoyed by email and SMS text messaging, including operational simplicity and self-documentation. Such developments are paralleled by the convergence of voice and data in other telecommunications systems.

The Spinvox system is moving from what, from the outside, is a speaker independent problem towards a speaker dependent problem which is a huge insight into making speech work in telephony. Why? Because it is using the fact that calls, messaging and other communication is driven by community use—i.e. 80% of voicemails come from just 7-8 people. SMS just 5-6. IM just 2-3. Spinvox uses 'call-pair' history to do several things:

1. build a profile of what a certain caller says every time they call—a speaker dependent speaker model—how the caller speaks (intonation, etc. . . . );

2. build a language model of what that caller says to someone—a speaker dependent language model—what the caller says (words, grammar, phrases, etc. . . . );

3. in 1 & 2 we are really building a language model of how A speaks to B. This is more refined than just how A speaks in general. It is atypical to the messaging type (i.e. how you speak in Voicemail) and it is also atypical to how you speak to B (e.g. the way a person speak a message to his mother is very different in intonation/grammar/phrases/accent/etc. . . . than when he speaks to his wife).

4. Spinvox is building speaker-receiver pair models that go from general speaker/language independence to dependent without any user input or training;

5. Spinvox has the ability to use both party's language to each other (e.g. how I call back and leave a message) to further refine relevant words (e.g. dictionary), grammar/phrases, etc. . . .

Further details on these aspects of the Spinvox Voice Message Conversion System are given in Appendix I below.

Appendix I

SpinVox—Voice Message Conversion System

The SpinVox Voice Message Conversion System (VMCS) focuses on one thing—conversion of spoken messages into meaningful text equivalent. In this, it is unique as are the methods and technologies advanced herein.

Concept

A novel method of converting voice-messages into text using multi-stage Automatic recognition techniques and human assisted Quality Control and Quality Assurance techniques and processes. The automated and human elements interact directly with each other to generate live/real-time feedback which is core to the system always being able to learn from live data to stay in-tune and deliver consistent quality. It is also designed to take advantage of the inherent limits of AI (ASR) and greatly improve accuracy by use of contextual bounds, human guidance, and language data live from the Internet.

Issue

Traditional approaches to speech conversion have been very much geared at the Recogniser level and creating high quality automatic speech recognition in laboratory conditions where inputs are highly controlled and guarantee a high level of accuracy.

The problem is that in the real world, speech recognition has many other elements to contend with:

- Random speakers—anyone can use it
- Noisy input—background noise and poor quality of speaker
- Poor and variable transmission quality with lossy compression and bad mobile handset connections
- Grammatically incorrect speech, slang, or highly localised expressions
- Contextual sensitive grammar or implied meaning from a unique context between message creator and recipient
- Context changes within a message—context boundaries—that invalidate the use of normal grammar rules to cite a few and they all constantly vary with time, so the actual source input isn't a defined problem in time, but a constantly evolving one.

Solution

Key is to correctly define the problem: conversion of spoken messages into meaningful text equivalent.

This does not mean perfect, verbose transcription, rather the most important pieces of the message presented in easily understandable form. Accuracy measures are both quantitative and qualitative as the ultimate score is User Rated Accuracy where the SpinVox VMCS scores a consistent 97%.

There are two key parts:

- Use a constant, live feed-back mechanism for the learning system, human driven
- Use contextual information to better define each conversion problem Using contextual information helps the system better estimate the likelihood of something being said in a message given the message's:

- Type
- Length
- Time of day
- Geography
- Caller context—both caller and recipient (call-pair history)
- Recent events
- Etc. . . .

and known language structure most likely to occur in certain message types—Natural Language, described below.

Natural Language

When analysing voice messages and spoken text messages, regular patterns occur in what people say, how they say it and in what order—Natural Language. This clearly varies by message type or context, so for ordering Pizza, it would be different.

For example, in voicemail, how people greet can be well defined with 35 or so of the most common expressions—"Hi, it's me", "Hello, it's Daniel here", "Hiya. How you doing?", "Watcha mate", "Alright?", etc. . . . and likewise good-bye's can be well defined by common expressions—"Ok, bye", "Cheers", "Cheers mate", "Thanks now. Bye. Cheers", etc. . . .

Clearly, different parts of a spoken message have implicit meaning and therefore using this key we can improve recognition accuracy by using this context to select the most likely classification of what was actually said.

Building these into large statistically related models is what is defined as our Natural Language Model, one for each language, including dialects within any language.

Context Vectors

Natural language is often governed by its context, so when converting the body of a message, the context of what has been said can be used to better estimate what was actually said—e.g. a call to a booking line will more likely see expressions related to enquiring and some specific names of the company, product and price, versus a call to a home phone number where friendly expressions regarding greetings, 'how are you', 'call me back', etc. . . . are much more likely.

Within voice-messages, we can use context vectors to better estimate the likely content and natural language set that applies:

- CLI (or any party identifier) is a very powerful context vector
  - Can tell from the number's geography likely language/dialect and regional real nouns most likely to be used
  - Can tell if number is a known commercial number and therefore message type better predicted—e.g. calls from 0870 no.s are commercial and therefore high chance this is a business message, whereas from 07 range is from a personal mobile, so time of day will drive message type more between business, personal, social or other.
  - Allows you to better get their number right if spoken inside the message
  - Is a key from which you can build history and known dictionary/grammar—e.g. always says 'dat's wicked man' in a street accent
  - Can build a speaker dependent recognition system—i.e. we can tune the ASR to you as a particular caller and get much higher recognition accuracy, your own vocabulary, grammar, phraseology, lexicon and general natural language
- Call Pair History—deeper use of CLI (or any party identifier)
  - You can train the system far more accurately to a call pair's message history
  - You can train to A party's (caller) voice regardless of B party (recipient)
  - You can train to subject area and language A party uses with B party
  - You can train multiple A & B party relationships and drive the system to higher accuracy and speed
- Time of day, day of week
  - Voicemail traffic rates, average message length and content type vary with time of day in each language market, from very business-like messages during peak hours (8 am-6 pm) to more personal (7-10 pm), to highly social (11 pm-1 am), to very functional (2 am-6 am). This also varies by day of the week so a Wed is the busiest day and contains highest level of business messages, but Sat & Sun have a very different profile of message type (largely personal, chatty messages) that need to be treated differently.
- International numbers
  - By parsing the country code (e.g. 44, 33, 39, 52, 01) we can better determine language and dialect.
- Available customer data
  - Customer name, address and possibly work place.
- Implied Context between A & B party Taking this on step further, there are many other very important clues that can help us better estimate the likely content of a message, particularly those that relate to who the two parties are, what the likely purpose of the message is, and where they're calling from or to.

In voicemail-to-text and spoken text, we know that having the caller's number

- Allows us to better estimate any number left inside the message
- Build history of known words, expressions, phrases, etc. . . . between the two parties
- Likely language (e.g. call from +33 to +33 will most likely be in French, but +33 to +44 may have a 50% chance of being in French)
- Names and their correct spellings If you know the history of the A party's calls/messages, and their history of messages for the B party, you can build a speaker dependent profile and gain large improvements from your recogniser and its grammar.

Conversion Quality

In addressing this problem, defining the actual required outcome is essential as it makes a big difference in your approach to solving how to convert voice-messages (voicemails, spoken SMS, Instant messaging, etc. . . . ) to text and how to optimally apply the conversion resource you have.

When someone leaves us a voice message, the purpose is a message, not a formal written piece of communication, so less accurate conversion will be tolerated as long as the meaning of the message is correctly conveyed.

In addition, there is asymmetry so that the message depositor isn't comparing what they said with the converted text. With the context of who called, the recipient is reading the converted output with the objective of finding out what the message is, so the requirement is excellent message extraction for conversion, not a verbose (word-for-word, utterance-for-utterance) conversion. In fact, conversely, a verbose conversion, unless well dictated, is often perceived as a low quality message as it contains lots of inelegant and unwanted pieces of spoken message language (e.g. uhmms, ahhs, repeats, spellings of words, etc. . . . )

Therefore, quality in this context is about extracting the important elements of a message—Intelligent Conversion.

At it's simplest, there are three key elements that provide the most meaning and hence are essential to achieving message quality:

1. Who is it from—huge value in understanding meaning from this context
2. What's the purpose of the message—e.g. call me back urgently, running late, change of plan/timings, call me on this no., just to say hi, etc. . . .
3. Any specific facts, the most common being:
   a. Names
   b. Numbers, phone numbers
   c. Time
   d. Address Other information in the message is largely there to support conveying these key elements and often helps provide better context for these key elements.

Varying Quality Sensitivity within Message

What's also very important to understand is that we need to recognise that each key part of any message has a different role in delivering the message and we can therefore attribute another dimension of quality to each that we should aim to achieve during conversion.

Messages can be broken down into

Greeting (top)

Message (body)

Good-bye (tail)

The percentage of messages that contain any body is clearly a function of deposited message length, so we know that short messages (e.g. sub 7 seconds) typically only contain a Greeting and a Goodbye. Above this, the probability of a meaningful message body grows exponentially. This fact also helps us better estimate the likely conversion strategy we should use.

Greeting & Good-Byes

How someone greets you can be classified into a some 50 commonly recognised salutations (e.g. Hi there, hey it's me, Hi, this is X calling from Y, Hello, I'm just calling to . . . , etc. . . . ). Likewise, the 'good-bye' element of a message can be classified into a similar order of commonly recognises good-byes (e.g. Thanks very much, see ya, Ta, good bye, Cheers now, see you later, etc. . . . )

Two issues dictate our conversion quality requirement:

1. Greetings and Good-byes are there for message protocol and often contain little of value for the main message, so our tolerance to low accuracy is high, provided that it makes sense.
2. We can classify the vast majority of Greetings and Good-byes into some 50 commonly recognised categories each.

Therefore, the quality requirement during a Greeting, a salutation or Good-bye is far less than what's contained in the message body, normally the point of a message or a key fact—e.g. call me on 020 7965 2000

Message Body

The message body naturally has a higher quality requirement, but it likewise can often be found to contain regular patterns of natural language that relate to the context and we can therefore also apply a degree of classification to better help us attain the correct answer.

A good example is:

"Hi Dan, John here"—Top of message (or greeting)

"can you give me a call back on 0207965200 when you get this"—Body of message

"Thanks a lot mate. Cheers. Bye bye."—Tail of message (or good-bye)

In this case, the Body is a well structured piece of Voicemail Language that the SpinVox Conversion System has learnt. It can then break the message down and correctly assign the body outcome.

Elements in this case that apply are:

- A & B party known
- Phone number is John's CLI, or seen before in his calls to others
- Message length—sub 10 seconds, so more likely to be common expression
- Time of day—working hours—John normally doesn't leave detailed messages in working hours, just short, simple messages.

SpinVox Voice Message Conversion System

Having correctly stated our problem and identified some very important features of speech and how it relates to the text equivalent, the SpinVox system (see FIG. 2) was designed to take full advantage of these:

SpinVox Voice Message Conversion System

This diagram shows the three key stages that enable us to optimise our ability to correctly convert voice-messages (voicemail, spoken SMS, Instant messages, voice clips, etc. . . . ) to text.

A key concept is that the system uses the term Agent for any conversion resource, whether machine/computer based or human.

Pre-Processing

This does two things:

1. Optimises the quality of the audio for our conversion system by removing noise, cleaning up known defects, normalising volume/signal energy, removing silent/empty sections, etc. . . .
2. Classifies the message type for optimally routing the message for conversion, or not.

Classifying the message type is done using a range of 'Detectors':

Language
- e.g. English UK/US/Auz/NZ/S.Africa/Canadian and then to dialect types within it it (e.g. within UK—S.East, Cockney, Birmingham, Glasgow, N.Ireland, etc. . . . )
- Allows us to determine if we support the language
- Allows to select which conversion route to use: QC/QA profile, TAT rules (SLA), which ASR stage strategy (engine(s)) to load and which post-processing strategy to apply Methods:

Statistical Language Identification
- Prior art:
  - several methods of automatic language identification known
- SpinVox solution:
  - base decision on context: knowledge about registration, location and call history of caller and receiver Signal Based Language Identification
- Problem with Prior art:
  - high accuracy methods require large-vocab speech recognition or at least phone recognition, hence expensive to produce and run
  - requirement for reliable and fast method based purely on recordings (labeled with language but nothing else)
- SpinVox solution:
  1. automatically cluster speech data for each language (vector quantization)
  2. combine cluster centres
  3. use statistical model of sequence of clusters for each language to find best match
  4. build model of relationship between score differences between models and expected accuracy
  5. combine several versions of 1-4 (based on varying training data, feature extraction methods etc) until desired accuracy is achieved Noise—SNR detector
- If the amount of noise in a message is above a certain threshold, then it becomes increasingly difficult to correctly detect the message signal and convert. More meaningful is if the ratio of the signal-to-noise drops below a certain level, then you've a high degree of confidence you won't be able to convert the message.
- SpinVox users value the fact that when they receive a notice that the message was unconvertible, the source audio is so poor that over 87% of the time they call or text the person directly back and continue the 'conversation'.

Speech Quality Estimator
- If the quality of someone's speech is likely too low for either the conversion system or agent to use. OR, content that a user ought to listen to themselves—e.g. someone singing them a happy birthday
- SpinVox solution includes:
  1. find drop-outs (voice packets lost during transmission) based mainly on zero-crossing counts
  2. also estimate noise levels
  3. calculate overall measure of voice quality and use adaptive threshold to reject lowest quality messages Hang-up ('slam-down') detector
- Messages where someone called, but left no meaningful audio content. Typically short messages with background utterances.

Inadvertent Call detector
- Typically a call from the redial button being pressed whilst in someone's pocket and leaving a long rumbling message with no meaningful audio content in it Standard Messages
- Pre-recorded messages, most common in US, from an auto-dialling system, or service notices or calls.

Greet & Good-Bye
- If the message only contains these, then we can use a dedicated piece of ASR to correctly convert these messages Message Length & Speech Density
- Length allows us to initially estimate the likelihood of message type—e.g. short call normally just a simple 'hi, it's X, call me back please' vs. long call which will contain something more complex to convert
- Speech density will allow you to adjust your estimate of how likely a message length is to be a good indicator of type—e.g. low density and short message is likely to be just a simple 'hi, it's X, call me back please', but high density, short message will skew this towards you needing a higher level of conversion resource as message complexity will be higher.

Clearly, pre-processing allows us in certain cases (e.g. slam-down, inadvertent call, foreign/unsupported language) to immediately route the message as classified and send the correct notification text to the recipient (e.g. 'this person called, but left no message'), saving any further use of precious conversion system resources.

Automatic Speech Recognition (ASR)

This is a dynamic process. The optimal use of conversion resources is determined at a message level.

We take input from both the Pre-Processing stage on message classification and from any context vectors and use these to choose the optimal conversion strategy. This means that this stage is using the best ASR technology for the particular task. The reason is that different types of ASR are highly suited to specific tasks (e.g. one is excellent for greetings, another for phone numbers, another for French addresses).

This stage is designed to use a range of conversion agents, whether ASR or humans, and only discerns between them based on how the conversion logic is configured at that time. As the system learns, this is adapted and different strategies, conversion resources and sequences can be employed.

This strategy isn't only applied at the whole message level, but can be applied within a message.

Top'n'Tail

A strategy is to sub-divide the message's Greeting (top), Body and Goodbye (tail) sections, send them to different pieces of ASR that are optimal for that element of a message. Once they've completed, they're re-assembled as a single message.

Number Routing

Another strategy is to sub-divide out any clear elements where phone numbers, currencies or obvious use of numbers is spoken in the message. These sections are sent to a specific piece of ASR or Agent for optimal conversion, then reassembled with the rest of the converted messages.

Address Routing

Likewise, sub-dividing out elements where an address is being spoken can be sent to a specific piece of ASR or Agent, and to an address co-ordinate validator to ensure that all pieces of an address converted are real. E.g. if you can't detect the street name, but have a clear post-code you can complete the most likely street name. The accuracy of finding the street name is improved by reprocessing the address again, but with your estimated a priori street name refining your ASR classification variables to a much more limited set and seeing if there's a high match or not.

Real Noun Routing

Real nouns are renowned for making ASR unreliable. Again, but focusing on just this part and applying much more specialised, but computationally more expensive resource, you can much better estimate the real noun.

Post Processing

The ASR stage contains its own dictionaries and grammar, but this isn't sufficient to correctly convert the many complex ways we speak. ASR is very much geared at the word level conversion and very short sequences of words for estimating likelihood of word sequences and basic grammar (n-gram and trellis techniques). One problem is that mathematically speaking, as you widen the set of words you try to estimate the possible combinations of beyond 3 or 4, the permutations become so large that your ability to pick the right one diminishes faster than any gain made by widening the number of sequential words, so it's currently an unreliable strategy.

A very good method is to look at wider phrases or sentence structures that occur in Natural Language. Approaching the problem from the macro level, you can estimate better solutions for errors or words/sections where the ASR confidence is low.

However, this too has its weaknesses. As mentioned, human speech contains much noise, artefacts and because of the intimate relationship between A and B parties, is prone to large contextual boundaries. Some things make no sense to anyone other than to people who have a huge set of context in which to make much sense out of seemingly random phrases or unreliable sounding words.

For instance, "see you by the tube at Piccadilly opposite the Trocadero and mine's a skinny mocha when you get here" would make no sense to anyone unless they knew the possible meaning of 'tube', they'd been to London and knew that Piccadilly has a building called the 'Trocadero' very close by and understood that in Starbucks nearby they serve a drink called a 'mocha' and it's low fat, i.e. 'skinny'.

Real-World Corpi—Context Check

One solution is to look at a very large corpus of English words, real-nouns, phrases, sayings, regular expressions to check that your conversion might have contained these sequence of words.

The problem is that in normal speech, there are enormous possible combinations of these, and critically, this lacks any real-world context check. How do you know that the combinations of real nouns Piccadilly, Trocadero, mocha and skinny are valid, let alone good conversions of your source audio? The only absolute is a real-world check and unfortunately, by definition, we humans are the only ones at the moment able to qualify whether something has real-world validity or not—we do after all still program computers and databases they rely on.

With human level intelligence, you can most accurately check whether these seemingly unconnected items have any likely context in the real world. However, humans also lack in complete knowledge of everything which is why a significant percentage of Londoners wouldn't be comfortable knowing whether this phrase was likely or not given their knowledge of Piccadilly.

A solution is to use the planet's largest corpi of human knowledge. The billions of pages and databases created by human editors available on the Internet. A simple query as to whether the sentence, or any element of your conversion, is cited on the internet gives you a highly qualified real-world test of whether this is something humans have likely experienced and recorded and therefore might be real. So in the above example, we find that Google, Yahoo!, MSN and other major search engines are able to give enough page hits with these in that we have a highly improved confidence that our conversion is indeed correct.

Further, using the Internet, we can most often find the correct spelling of phonetic approximations of words, real-nouns and place names that ASR attempts with new or unknown words if comes across. Currently, this is done through enormously time consuming and expensive manual programming of the ASR's dictionaries.

The other extremely valuable benefit of this solution is that the Internet is a live system that very accurately reflects current language, which is an evolving and dynamic subject and can vary with a single news headline, so you're not reliant on constantly updating your ASR dictionaries with a limited sub-set of natural language, but have access to probably the planet's most current and largest source of natural language.

EXAMPLE

SpinVox converts the following audio:

Message from English person

Audio: "The cat sat on Sky when Ronaldo scored against Cacá"

Converted text:

The cat sat on sky when Rownowdo/Ron Al Doh/Ronaldow/Ronahldo scored against Caka/Caca/Caker Problems:

- 'sat on sky' is grammatically incorrect—you can't sit on 'sky' in dictionary context
- Rownowdo/Ron Al Doh/Ronaldow/Ronahldo are possible solutions for an unusual real noun
- Caka/Caca/Caker are guesses of a highly unusual real noun Searches on Google for trouble elements of this phrase show:

- Sky is a brand name—no. 1 rank for 'on Sky'. Therefore, it is a real noun for an object, so 'The cat sat on Sky' is possible grammatically and valid
- The first name is most likely Ronaldo just from spell checks alone of all versions (Google's "Did you mean: Ronaldo?")
- Ronaldo is highly correlated with 'Ronaldo scored' as he's a very famous football player and the search returns a large number of exact matches for this phrase
- The second name is most likely Cacá, because Cacá has most hits for 'scored against Cacá'.
- We further our confidence by searching for 'football Cacá'—football being derived from the context of 'Ronaldo scored'—and we get a large number of highly correlated search results. Given 'Ronaldo scored' has already returned a large number of successful searches, we are more confident that 'Cacá' is the most likely fit.
- Further, the real-world nature of data indexing of Google means that terms being used today, current terms, get higher rankings than less current terms, which is essential in getting speech recognition to work for current language and context.

Queue Manager

The Queue Manager is responsible for:

- Determining what should happen to a voice message at each stage—conversion strategy
- Managing the decision of each Automated stage when it requires human assistance
  - If at any stage of the automated conversion confidence intervals or other measures suggest any part of a message won't be good enough, then the Queue Manager directs this to the correct human agent for assistance.
- Guaranteeing our Service Level Agreement with any customer by ensuring we convert any message within an agreed time—Turn Around Time (TAT)
  - typically TAT is an average of 3 mins, 95% within 10 mins, 98% within 15 mins.
- Making decisions by calculating trade-offs between conversion time and quality. This is a function of what the SLA allows, particularly to deal with unexpected traffic or abnormal language use spikes and performance to-date.

This is achieved by use of large state-machines that for any given language queue can decide how best to process the messages through the system. It interacts with all parts and is the operational core of the SpinVox VMCS.

Quality Control Application

Appendix II contains a fuller description of this Lattice method as used within the SpinVox Quality Control Application.

Figure 2:
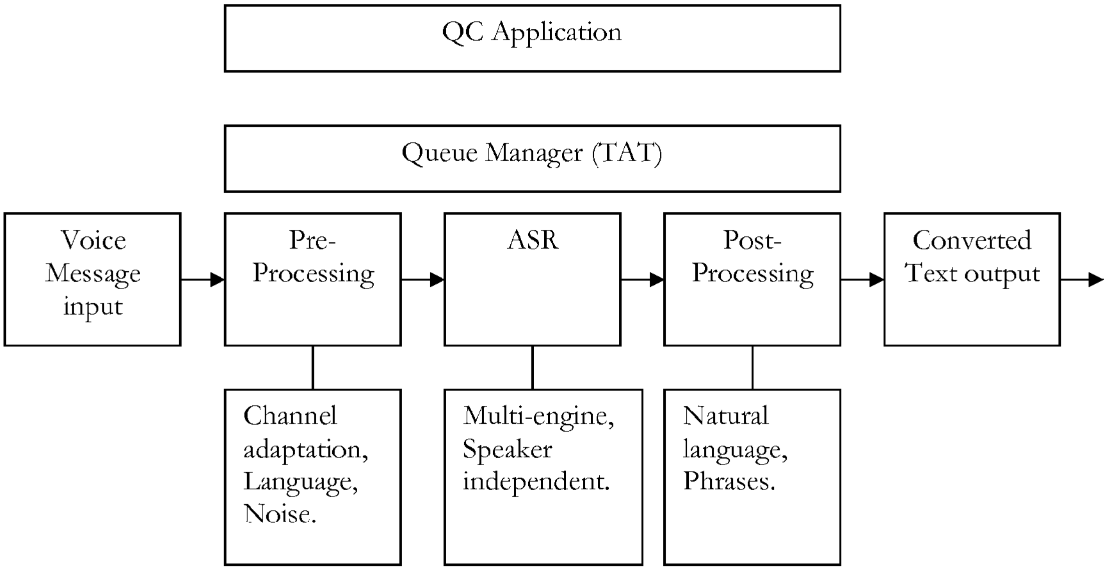

As shown in the Voice Message Conversion System (VMCS) FIG. 2 diagram, human agents interact with messages at various stages. They do this using the Quality Control Application.

They also use a variant of this tool to randomly inspect messages to ensure the system is correctly converting messages as one of the problems with AI is that it is unable to be sure that it really is accurate.

A key inventive step is the use of humans to 'guide' the conversion of each message. This relies on the SpinVox VMCS databases, which contain a large corpus of possible matches, ASR and a human inputting a few words to create predictive typing solutions. In its extreme case, no human is required and the conversion is fully automatic.

Issue

ASR is only good at word level matches. To convert a meaningful message, phrases, sentences and grammar for spoken messaging is necessary. ASR will produce a statistical confidence measure for each word level match, and phrase where available. It is unable to use context or natural language rules to complete the process of a meaningful and correct conversion.

What automated systems are good at is spelling and base grammar—consistency.

What humans are good at are meaning, context, natural language, spoken grammar, dealing with ambiguous input and making sense of it. Humans tend to be inconsistent with spelling, grammar and speed.

Business Issue

Using humans costs money, so anything that can be done to use them for only the things that matter, and hence of economic value, is essential.

SpinVox VMCS uses the concept of Agent Conversion Ratio (ACR)—the ratio of the time it takes and agent to actually process a message to the length of the spoken message. Anything that reduces ACR and improves message conversion quality is a business driver as a 1% reduction in ACR leads to at least a 1% improvement in gross margin. In fact, the sensitivity is even higher as not only is direct cost of goods sold reduced, but management overhead and operational availability of the service and scalability all benefit from fewer humans required.

Solution

Lattice method: use human agents to guide the system to pick the correct set of words, phrases, sentences, messages from a pre-determined list of most likely options.

The SpinVox VMCS databases hold a rich history of message data as large statistical models (dictionaries and grammar with context vectors that relate them) that can be drawn upon in two key ways:

Lattice Method i. The VMCS language model uses context (e.g. call pair history, language, time of day, etc. . . . —see Context Vectors) to pick the most likely conversion (the Proposed Conversion) to show to the agent.

ii. As the message plays back, the agent selects either a letter to choose an alternative (can be just the first few letters of the correct word), or hits 'accept' to accept the proposed section of text and move on to the next section.

iii. As the agent types changes, the system uses this as both input to pick the new most likely conversion and as feedback (learning) so that the next time it is more likely to get the right match first time.

iv. What would normally require an agent to type a full message worth of characters (e.g. 250), only takes a few key-strokes to complete and in real-time or faster.

v. The agent output is now constrained to correct spelling, grammar and phraseology, or rules about these that control quality and better message meaning.

This can be presented to the agent in two key ways:

1. ASR Assisted Proposed Conversion

In this case, ASR is first used to better predict which text should be the Proposed Conversion for the agent. It uses what's actually in the audio of the spoken message to reduce the set of possible conversion options to a minimum, thus improving accuracy and agent speed.

a. ASR can be used for the initial proposed conversion b. ASR can then be continuously used as the agent inputs selections to further refine the remaining sections of the proposed conversion Prior art: Humans correcting transcriptions with choice of word alternatives Problem with prior art:

- Corrections still time consuming
- ASR engine could have made better decision (later in utterance) if the user correction had been known during decoding 2. Full Predictive Text Typing Just like 1. above, but where no ASR is used to select the Proposed Conversion shown to an agent. This is different to standard predictive text editors as it relies on specific history (VMCS language models and use of context vectors—e.g. call pair history) and works at phrase level and above.

Prior art: predict most frequent word (list of alternatives) given partial human input Problem with prior art:

- Most frequent word very often not the one the user wants
- Predictions just for one word In either case, the SpinVox VMCS language models are trained purely by humans, or by a combination of ASR and humans.

In the extreme case, the system is fully trained and is able to always pick the right Proposed Conversion first time and only require human assistance for Quality Assurance to randomly sample and check the VMCS is correctly self-governing.

Appendix II—Lattice Method

Assorted Observations and Assumptions

1. Given the large vocabulary and the varying audio quality, it seems impossible to achieve high enough speech recognition accuracy for fully automatic conversion for more than a tiny fraction of utterances. Reliably detecting this fraction, i.e. deciding that no human check is needed is a very interesting longer-term research problem but probably not a realistic option in the short term.
2. While a good operator has a target ACR of 3-4, the average is more like 6-8.
3. Correcting an utterance that is already 90% correct takes about 1.2. (Source: SpinVox Operational Research 2005)
4. 75% of correction time is spent on finding and selecting errors (Wald et al).
5. Word selection lists (alternatives) reduce listening time (Burke 2006).
6. Errors tend to cluster (Burke 2006).
7. Double speed playback keeps intelligibility and users appear to prefer it after short training (Arons 97).
8. Removing pauses and 50% faster playback give real-time factor ⅓ (Arons 97).
9. According to Bain et al 2005, normal typing has ACR 6.3 which equals ACR for editing ASR output with 70% accuracy. Shadow transcription is mentioned as "viable" for live subtitling.

Approach

The main aim has to be reducing the agent conversion ratio (ACR) by using speech technology to support the agent. This can be achieved in a number of ways:

1. Let the agent make the decisions we can't afford to get wrong, i.e. the overall meaning of the message or individual phrases. The machine can fill in the details.
2. Offer predictions while the agent types/edits the utterance. This might not just save typing time but also helps avoiding spelling mistakes.
3. Provide (simplified) capitalization and punctuation automatically so that the agent doesn't need to deal with these issues.

Call Handling Steps

1. Agent listens to message at high speed (e.g. ½ real time).
2. Agent presses button to select category (e.g. "please_call_back", "just_calling_back", . . . "general").
3. In some cases, the utterance is immediately accepted. This will happen if the message follows a simple pattern defined for the message category, the speech quality was good and there are no important but easily confusable parts in the message (e.g. times).
4. System proposes converted string, agent edits while system continuously (and instantly) updates proposed utterance using predictions based on speech recognition results.
5. Agent presses key to accept utterance as soon as the displayed utterance is correct.

An example for call handling step 4 is shown in FIG. 3.

In this example, the agent would need 35 key strokes to edit an utterance with 17 words and 78 characters:

15*<accept_word> (e.g. tab)

14*<accept_char> (e.g. right arrow)

6*normal input

1*<accept_utterance> (e.g. Enter)

Most of them should be very quick because the same key has to be pressed a few times. Only 6 of them require selecting a normal key.

Note that only 6 of the 17 words (35%) were correct in the utterance originally proposed by the system.

Implementation

Processing Steps

1. A Speech Recognition engine (e.g. HTK) converts the utterance speech file into a lattice (i.e. word hypothesis graph—a directed, a-cyclic graph representing a huge number of possible word sequences).
2. The lattice is re-scored to take into account phone number pair) specific information (e.g. names, frequent phrases in earlier calls etc).
3. The lattice is augmented to enable very fast search during the editing phase (e.g. the most likely path to the end of the utterance is computed for each node and the arc starting this path stored, character-sub trees are added to each node representing decision points). "Families", i.e. several arcs differing only in their start and end times are combined within certain limits.
4. When the agent selects a specific category (step 2 in "Call handling steps"), a corresponding grammar and language model are selected for parsing and dynamic re-scoring. When the category is "general", an unrestricted "grammar" is used.
5. The highest scoring path through the lattice matching the selected category grammar (if appropriate) is selected.
6. The result found in this way will be accepted immediately if:
   a. The category is not "general".
   b. The score difference to the highest scoring unconstrained path is within a given range. This range can be used as a parameter to dynamically control the tradeoff between speed and accuracy.
   c. According to the grammar used to find the path, the utterance does not contain crucial parts that are easily confusable (e.g. times).
7. When the user accepts words or characters, the system moves along the selected path through the lattice.
8. As characters and words are accepted or typed, their color or font changes.
9. When the agent types something, the system selects the highest scoring path (again taking into account the current grammar and possibly other, e.g. statistical information) that starts with the character(s) typed. This new path is then displayed.
10. When an agent types a word not found in the lattice, it is automatically spell-checked and correction is offered if appropriate.
11. After the agent presses <accept_utterance>, the text is processed to add capitalization and punctuation, correct spelling mistakes, replace number words by digits etc. This uses a robust probabilistic parser using grammars semi-automatically derived from the training data.

Audio Playback

The nodes in the lattice contain timing information and hence the system can keep track of the part of the message the agent is editing. The agent can configure how many seconds the system will play ahead. If the agent hesitates, the system plays back the utterance from the word before the current node.

Refinement Options

Mark Important and Unimportant Parts i. Depending on the relevant category and grammar, specific parts of the displayed utterance text that are deemed crucial are highlighted while particularly unimportant parts (e.g. greeting phrases) are shaded out.

Use Phrase Classes for Unimportant Parts

Parts of the message are displayed as phrase classes instead of individual words. The agent only needs to confirm the class while the choice of the individual phrase is left to the ASR engine because a mistake in this area is considered unimportant. For instance, the class "HEY" could stand for "hi, hay, hey, hallo, hello" and the earlier example could be displayed as shown in FIG. 4. In this version, the "<accept_word>" key applied to a phrase would accept the whole phrase. Typing a character changes back to word mode, i.e. the phrase class marker is replaced by individual words.

Limit Prediction Display

Displaying the wrong predictions might actually confuse the agent and it might be worth displaying only those (partial ones) the system is relatively certain about.

Alternatively, the relative confidence in various predictions could be color-coded in some way (cf. "confidence shading"), e.g. uncertain ones (usually further away from the cursor) are printed in very light gray while more reliable ones are shown darker and bolder.

Utterance Segmentation

Longer silence periods are detected and used to break the message up into segments. The user interface reflects the segmentation and an extra key is assigned to "<accept_segment>". This enables confirming larger phrases with one key press and also resynchronization if the agent types a word not extending the current path through the lattice.

Keep Cursor on Left Side of Screen

Have a big area in the middle of the screen that shows the current phrase in large letters. As editing goes on, move the text (keep the cursor in same position). Show only a few words left of the cursor. As words drop out of the middle area, they move to the top area (smaller font, gray). More phrases are displayed below, again small and gray.

Show Phrase Alternatives

Always or after key press, show alternative phrase completions like drop down menu right of cursor and allow selection with arrow keys. This means the agent doesn't need to think about the first characters of the correct word which should help for difficult words.

Move Cursor with Speech

As the message is played back, the word spoken is highlighted automatically and the cursor is moved to the start of the word.

Play Highlighted Region

The agent can select a region (e.g. left and right mouse key) and the system keeps playing the segment between the markers until the agent moves on.

Shadow Transcription for Individual Words or Phrases

Words are highlighted as they are played to the agent and in addition to typing, the agent can simply say the word to replace the currently highlighted one (and the rest of the phrase). The system dynamically builds a grammar from the alternative candidates in the lattice (words and phrases) and uses ASR to select the correct one. This is a technically difficult option because ASR needs to be used from within the QC app and the appropriate speaker-dependent models need to be trained and selected at run time.

Accuracy Considerations

Most Likely Result

The accuracy of the highest scoring result after the speech recognition step is expected to be rather low (e.g. 25%). So the result displayed initially will only rarely be correct. IBM reports a word error rate of 28% for voice mail in Padmanabhan et al 2002.

When an utterance category can be identified (guessing: 20% of cases), the chance of getting a correct overall result should be reasonably high (say 70%) if the "phrase class" approach is used, i.e. if errors in the exact phrases used for top and tail are accepted and either there are no difficult parts in the message or they can be verified using other information (phone owners, previous calls). A rough guess would be that overall about 10% of utterances could be handled with just one key-press (the one needed for category selection).

Error Correction

It has been observed that speech recognition errors tend to occur in clusters, e.g. the average number of subsequent words containing an error is about 2 (TODO: find reference). This is usually due to:

- segmentation errors—the first incorrect word is shorter or longer than the correct one and hence the next word must be wrong as well
- the influence of the language model
- possibly co-articulation modeling This observation motivates the expectation that a correction of one word during the editing process will typically correct more than one mistake in the utterance hypothesis.

Very roughly speaking, typing one character limits the number of contenders for the next word by a factor of 1/26. Two characters limit it to 1/676 and should almost certainly exclude all higher scoring incorrect ones. This motivates another prediction: one ASR error should in the average require not more than one keystroke to correct.

Best Path through Lattice

A very important factor for the success of the system is the percentage of lattices containing the correct path even if it has a comparatively low score. If the correct path is not in the lattice, the system will at some point not be able to follow a path through the lattice and hence it will be difficult to produce new predictions. The system might need to wait for the agent to type two or three words before finding appropriate points in the remaining lattice again to create further predictions.

The size of the lattice and hence the chance of getting the correct utterance can be controlled by parameters (number of tokens and pruning) and in theory the whole search space could be included. This would produce huge lattices, however, that could not be transmitted to the client within an acceptable time frame. Furthermore, we have to deal with the occasional occurrence of previously unseen words that would consequently not be in the vocabulary. After a few months of operation (and hence data collection) a rate of about 95% seems achievable.

If the "Utterance segmentation" version described above is used, the segments would provide easy points for re-starting prediction.

Linguistic Post-Processing

It might be worth defining a simplified "SpinVox message" syntax for each language. SMSs are generally not expected to contain full, proper sentences and rather than attempting to add a lot of punctuation (and often getting it wrong), it might be worth to use it rarely but consistently.

Capitalization

This is comparatively easy in English but more difficult in other languages (e.g. German).

Expected Benefits

1. While converting or editing, the system keeps track of where in the utterance the agent currently is and hence audio playback can be controlled better.
2. For a certain proportion of utterances, where the agent only needs to determine the category, the ACR could be less than one (theoretically 1/3 with fast playback and silence removal).
3. A significant number of messages, for which the ASR performance is high, will require only a quick check and very few keystrokes to make corrections, giving an ACR of about 2.

4. Most messages will still need significant editing. To what extent these cases will benefit from the predictions still has to be determined.
5. Handling capitalization and punctuation automatically should reduce ACR by a small percentage and also improve consistency.

Questions/Issues

1. When does editing with ASR-controlled predictions become more time consuming then simply typing? To take advantage of the predictions, the agent needs to read them. If the next few words are predicted correctly, simply accepting them should be faster than typing them but if the next word is wrong, the additional time required to check it is simply wasted. On the other hand, the agent needs to listen anyway and might as well use the time for checking the predictions.

Combining Prediction Methods

It seems promising to use statistical predictions as a back-up for ASR-based prediction.

Since the statistical prediction model is static (not call dependent) and hence doesn't need to be transmitted to the QC application with every message, it can be rather comprehensive. Lattices have to be transmitted for each message and hence will have to be kept within certain size limits and are likely to miss some of the hypothesis needed.

Both the statistical and the ASR-based prediction models would be represented as graphs and the task of combining the predictions would involve traversing both graphs separately and then either choosing the more reliable prediction or combining them according to some interpolation formula.

This method could be extended to more prediction model graphs, for instance based on call pairs.

Statistical Predictions

These predictions are based on n-gram language models. These models store conditional word sequence probabilities. For instance, a 4-gram model might store the probability of the word "to" following the three word context "I am going". These models can be very big and efficient ways of storing them are required that also enable fast generation of predictions.

Implementation

N-gram models are typically stored in a graph structure where each node represents a context (already transcribed words) and each outgoing link is annotated with a word and the corresponding conditional probability.

Since there will always be words that were never (or very rarely) encountered after a certain context but that are still required at run time, the model needs a way of dealing with previously unseen words in a given context. This is achieved by "backing-off" to the corresponding shorter context. In our example, if "to" had not been observed after "I am going", the model would look for "to" after "am going". If it wasn't observed there either, it would look at the context node for "going" and finally at the empty context node where all the words in the vocabulary are represented. This "backing off" is implemented by adding a special link to each context node that points to the node with the corresponding shorter context and is annotated with a "back-off penalty" that can be interpreted as the (logarithm of the probability mass not distributed over all the other links outgoing from the node.

The overall log probability of "to" after "I am going" could for instance be calculated as back_off("I am going")+back_off("am going")+link_prob("to"@ context node "going").

Word Graph Expansion

It would be computationally expensive to search for the most likely word (link) starting with a given character sequence every time the user presses a key. One way to speed this up relies on expanding the word graph into a character graph where the outgoing links at each node are sorted by decreasing likelihood. Note that the maximum number of outgoing links at each node is the number of characters in the language plus two for the back-off link and the word end link. Hence searching through this list would require at most about 100 character comparisons for English with the expected cost less than about 50 comparisons taking into account that the most likely words will be tried first.

This ignores the cost of searching for words not found at the current context node. When this is required, it might be best to accept that predictions can't be generated very quickly and to use the normal back-off link to search at the back-ff context nodes. The alternative of storing back-off links at each character node would require too much memory.

The expansion from the word graph to the character graph can be implemented in the following way:

1. For each (word-level) context node:
   sort all outgoing links by their probability (decreasing).
   For each link (in order):
      set pointer to current (word) node
      for each character:
         if there is already a link annotated with this character, set pointer to the node the link points to
         else: add new link to the node the pointer points to and create a new node as destination for the link. Set pointer to this new node.
      Add new link to pointer target, pointing to the destination of the current word link.

After the expansion, all word links (including their probabilities) can be deleted, except for the back-off links. Note that this will allow to always find the most likely phrase prediction but not the list of less likely ones. If this is required (later), the sequence in which the character expansion was performed would have to be stored in some way.

Prediction

Taking a word node id, a character node id, the current word sub-string and a character as input, the "prediction" method would:

1. Goto character node[character_node_id]
2. Find link annotated with the input character (use linear search in likelihood sorted links)
3. If found, follow the link and starting from its target node, follow the first link leaving each node until some stop condition is reached. At each transition, add the character found at the link to the result string. Return the node id of the initial target node and the result string.
4. Else: use back-off link from word_nodes[word_node_id] and the current word string to find predictions at the back-off node(s). This is not expected to find predictions at real-time if the user types quickly.

Appendix III

Core Concepts

The following concepts are covered. Each Core Concept A-I can be combined with any other core concept in an implementation.

The following text also describes various sub-systems that, inter alia, implement features of the Core Concepts. These sub-systems need not be separate from one another; for example, one sub-system may be part of another of the sub-systems. Nor do the sub-systems have to be discrete in any other way; code implementing functions of one sub-system can form part of the same software program as code implementing functions of another sub-system.

Core Concept A

A mass-scale, user-independent, device-independent, voice messaging system that converts unstructured voice messages into text for display on a screen; the system comprising (i) computer implemented sub-systems and also (ii) a network connection to human operators providing transcription and quality control; the system being adapted to optimise the effectiveness of the human operators by further comprising:

3 core sub-systems, namely (i) a pre-processing front end that determines an appropriate conversion strategy; (ii) one or more conversion resources; and (iii) a quality control sub-system.

Other Features:

The conversion resources include one or more of the following: one or more ASR engines; signal processing resources; the human operators.

The signal processing resources optimise the quality of the audio for conversion by performing one or more of the following functions: removing noise, cleaning up known defects, normalising volume/signal energy, removing silent/empty sections.

Human operators perform random quality assurance testing on converted messages and provide feedback to the pre-processing front-end and/or the conversion resources.

Core Concept B

Context Vectors

A mass-scale, user-independent, device-independent, voice messaging system that converts unstructured voice messages into text for display on a screen; the system comprising (i) computer implemented sub-systems and also (ii) a network connection to human operators providing transcription and quality control; the system being adapted to optimise the effectiveness of the human operators by further comprising:

a computer implemented context sub-system adapted to use information about the context of a message or a part of a message to improve the conversion accuracy.

Other Features:

the context information is used to limit the vocabulary used in any ASR engine or refine search or matching processes used by the ASR engine.

the context information is used to select a particular conversion resource or combination of conversion resources, such as a particular ASR engine.

context information includes one or more of caller ID, recipient ID, whether the caller or recipient is a business or other type of classifiable entity or not; caller-specific language; call-pair history; time of call; day of call; geo-reference or other location data of the caller or callee; PIM data (personal information management data, including address book, diary) of the caller or callee; the message type, including whether the message is a voice mail, a spoken text, an instant message, a blog entry, an e-mail, a memo, or a note; message length; information discoverable using an online corpus of knowledge; presence data; speech density of the message; speech quality of the message.

the context sub-system includes a recogniser confidence sub-system that determines automatically the confidence level associated with a conversion of a specific message, or part of a message, using the context information.

the context sub-system includes or is connected to a recogniser confidence sub-system that determines automatically the confidence level associated with a conversion of a specific message, or part of a message, using the output of one or more ASR engines.

the recogniser confidence sub-system can dynamically weight how it uses the output of different ASR engines depending on their likely effectiveness or accuracy.

knowledge of the context of a message is extracted by one sub-system and fed-forward to a downstream sub-system that uses that context information to improve conversion performance a downstream sub-system is a quality monitoring and/or assurance and control sub-system.

Core Concept C

Call-Pair History

A mass-scale, user-independent, device-independent, voice messaging system that converts unstructured voice messages into text for display on a screen; the system comprising (i) computer implemented sub-systems and also (ii) a network connection to human operators providing transcription and quality control; the system being adapted to optimise the effectiveness of the human operators by further comprising:

a computer implemented call-pair sub-system adapted to use call-pair history information to improve conversion accuracy.

Other Features:

the call-pair history enables the system to be user-independent but to acquire over time, without explicit user training, user-dependent data that enables conversion performance to be improved.

the call-pair history is associated with a pair of numbers, including numbers associated with mobile telephones, fixed telephones, IP addresses, e-mail addresses, or unique addresses provided by a network.

The call-pair history includes information relating to one or more of: likely language or dialect being used; country called from or called to; time zones; time of call; day of call; specific phrases used; caller-specific language; intonation; PIM data personal information management data, including address book, diary).

a computer implemented dynamic language model sub-system adapted to build a dynamic language model using one or more of: caller dependence; call-pair dependence; callee dependence.

The caller is anyone depositing a voice message, irrespective of whether they intend to place a voice call; and the callee is anyone who reads the converted message, irrespective of whether they were meant to receive a voice call.

a computer implemented personal profile sub-system adapted to build a personal profile of a caller to improve conversion accuracy.

The personal profile includes words, phrases, grammar, or intonation of the caller.

Core Concept D

3 Part Message Taxonomy

A mass-scale, user-independent, device-independent, voice messaging system that converts unstructured voice messages into text for display on a screen; the system comprising (i) computer implemented sub-systems and also (ii) a network connection to human operators providing transcription and quality control; the system being adapted to optimise the effectiveness of the human operators by further comprising:

a computer implemented boundary selection sub-system adapted to process a message by looking for the boundaries between sections of the message which carry different types of content or carry different types of message.

Other Features:

the computer implemented boundary selection sub-system analyses for one or more of the following component parts: a greeting part; a body part; a goodbye part.

different conversion strategies are applied to each part, the applied strategy being optimal for converting that part.

different parts of the message have different quality requirements and a quality assessment sub-system applies different standards to those different parts.

A speech quality estimator detects boundaries between sections of the message which carry different types of content or carry different types of message.

Boundaries are detected or inferred at regions in the message where the speech density alters.

Boundaries are detected or inferred at a pause in the message.

Boundaries are inferred as arising at a pre-defined proportion of the message.

A greeting boundary is inferred at approximately 15% of the entire message length.

Core Concept E

Pre-Processing Front-End

A mass-scale, user-independent, device-independent, voice messaging system that converts unstructured voice messages into text for display on a screen; the system comprising (i) computer implemented sub-systems and also (ii) a network connection to human operators providing transcription and quality control; the system being adapted to optimise the effectiveness of the human operators by further comprising:

a computer implemented pre-processing front-end sub-system that determines an appropriate conversion strategy used to convert the voice messages.

Other Features:

The pre-processing front end optimises the quality of the audio for conversion by performing one or more of the following functions: removing noise, cleaning up known defects, normalising volume/signal energy, removing silent/empty sections and classifies the message type for optimally routing the message for conversion, or not.

The pre-processing front-end determines the language being used by the caller, based on one or more of the following: knowledge about registration, location and call history of caller and/or receiver.

The pre-processing front-end selects a particular ASR engine to convert a message or part of a message.

different conversion resources, such as ASR engines, are used for different parts of the same message.

different conversion resources, such as ASR engines, are used for different messages.

the human operators are treated as ASR engines.

the pre-processing front-end uses or is connected with a recogniser confidence sub-system to determine automatically the confidence level associated with a conversion of a specific message, or part of a message, and a particular conversion resource, such as an ASR engine, is then deployed depending on that confidence level.

the conversion strategy involves the selection a conversion strategy from a set of conversion strategies that include the following: (i) messages for which an ASR conversion confidence is sufficiently high are checked automatically by a quality assessment sub-system for conformance to quality standards; (ii) messages for which the ASR conversion confidence is not sufficiently high are routed to a human operator for checking and, if necessary, correction; (iii) messages for which the ASR conversion confidence is very low are flagged as unconvertible and the user is informed of the receipt of an unconvertible message.

Core Concept F

Queue Manager

A mass-scale, user-independent, device-independent, voice messaging system that converts unstructured voice messages into text for display on a screen; the system comprising (i) computer implemented sub-systems and also (ii) a network connection to human operators providing transcription and quality control; the system being adapted to optimise the effectiveness of the human operators by further comprising:

a computer implemented queue manager sub-system that intelligently manages loading and calls in resources as required to ensure that converted message delivery times meet a pre-defined standard.

Other Features:

The queue manager sub-system determines what should happen to a voice message at each stage of processing through the system.

If at any stage of the automated conversion, confidence intervals or other measures suggest any part of a message are not good enough, then the queue manager directs this to the correct human operator for assistance.

The queue manager sub-system makes decisions by calculating trade-offs between conversion time and quality.

The queue manager sub-system uses state-machines that, for any given language queue, can decide how best to process the messages through the system.

Core Concept G

Lattice

A mass-scale, user-independent, device-independent, voice messaging system that converts unstructured voice messages into text for display on a screen; the system comprising (i) computer implemented sub-systems and also (ii) a network connection to human operators providing transcription and quality control; the system being adapted to optimise the effectiveness of the human operators by further comprising a computer implemented lattice sub-system that generates a lattice of possible word or phrase sequences and enables a human operator to guide a conversion sub-system by being shown one or more candidate converted words or phrases from the lattice and enabling the operator to either select that candidate word or phrase or, by entering one or more characters for a different converted word or phrase, to trigger the conversion sub-system to propose an alternative word or phrase.

Other Features:

The conversion sub-system receives inputs from a sub-system that handles call-pair history information.

The conversion sub-system receives inputs from conversion resources.

The conversion sub-system receives inputs from a context sub-system that has knowledge of the context of a message.

The conversion sub-system learns, from the human operator inputs, likely words corresponding to a sound pattern.

The human operator is required to select only a single key to accept a word or phrase.

The conversion sub-system automatically provides capitalisation and punctuation.

The conversion sub-system can propose candidate numbers, real nouns, web addresses, e-mail addresses, physical addresses, location information, or other coordinates.

The conversion sub-system automatically differentiates between parts of the message that are likely to be important and those that are likely to be unimportant.

Unimportant parts of the message are confirmed by the operator as belonging to a class proposed by the conversion sub-system and are then converted solely by a machine ASR engine.

The human operator can speak the correct word to the conversion system, which then automatically transcribes it.

Core Concept H

On-Line Corpus

A mass-scale, user-independent, device-independent, voice messaging system that converts unstructured voice messages into text for display on a screen; the system comprising (i) computer implemented sub-systems and also (ii) a network connection to human operators providing transcription and quality control; the system being adapted to optimise the effectiveness of the human operators by further comprising:

a computer implemented search sub-system that analyses a converted message against an on-line corpus of knowledge.

Other Features:

The on-line corpus of knowledge is the internet, as accessed by a search engine.

The on-line corpus of knowledge is a search engine database, such as Google.

The analysis of the converted message enables the accuracy of the conversion to be assessed by a human operator an/or a recogniser confidence sub-system.

The analysis of the converted message enables ambiguities in the message to be resolved by a human operator and/or an ASR engine.

Core Concept I

Detectors

A mass-scale, user-independent, device-independent, voice messaging system that converts unstructured voice messages into text for display on a screen; the system comprising (i) computer implemented sub-systems and also (ii) a network connection to human operators providing transcription and quality control; the system being adapted to optimise the effectiveness of the human operators by further comprising:

a computer implemented detector sub-system that is adapted to detect slam-downs.

Other Features:

The slam down detector is implemented as part of a pre-processing front-end.

Other Detectors that can also be Used:

A computer implemented detector sub-system that is tuned to detect different spoken languages, such as English, Spanish, French etc.

The language detector can detect changes in language part way through a message.

The language detector can use inputs from a sub-system that has call-pair history information that records how changes in language occurred in earlier messages.

A computer implemented detector sub-system that is adapted to estimate speech quality The speech quality estimator finds drop-outs, estimate noise levels and calculate an overall measure of voice quality and uses an adaptive threshold to reject lowest quality messages.

A computer implemented detector sub-system that is adapted to detect slam-downs.

The slam down detector is implemented as part of a pre-processing front-end.

A computer implemented detector sub-system that is adapted to detect inadvertent calls.

The inadvertent call detector is implemented as part of a pre-processing front-end.

A computer implemented detector sub-system that is adapted to detect and convert pre-recorded messages.

A computer implemented detector sub-system that is adapted to detect and convert spoken numbers.

A computer implemented detector sub-system that is adapted to detect and convert spoken addresses.

A computer implemented detector sub-system that is adapted to detect and convert real nouns, numbers, web addresses, e-mail addresses, physical addresses, location information, other coordinates.

Message Types

The message is a voicemail intended for a mobile telephone and the voice message is converted to text and sent to that mobile telephone.

The message is a voice message intended for an instant messaging service and the voice message is converted to text and sent to an instant messaging service for a display on a screen.

The message is a voice message intended for a web blog and the voice message is converted to text and sent to a server for display as part of the web blog.

The message is a voice message intended to be converted to text format and sent as a text message.

The message is a voice message intended to be converted to text format and sent as an email message.

The message is a voice message intended to be converted to text format and sent as a note or memo, by email or text, to an originator of the message.

Other Elements of the Value Chain

A mobile telephone network that is connected to the system of any preceding Claim.

A mobile telephone when displaying a message converted by the system of any preceding Claim.

A computer display screen when displaying a message converted by the system of any preceding Claim.

A method of providing voice messaging, comprising the step of a user sending a voice message to a messaging system as claimed in any preceding Claim.

The invention claimed is:

1. A voice messaging system for converting an audio voice message from a caller into text, the voice messaging system comprising:

a plurality of conversion resources for converting the audio voice message into the text for an intended recipient, the plurality of conversion resources comprising:

at least one automatic speech recognition (ASR) system to automatically recognize at least some of the audio voice message and generate a plurality of candidate word or phrase sequences; and a computer implemented boundary selection sub-system adapted to process the audio voice message to determine a type of at least one portion of the audio voice message as being a greeting portion, a message body portion and/or a tail portion of the audio voice message received from the caller and to select, based on a selected optimal conversion strategy, one or more different pieces of ASR for recognizing the at least one portion based on the type determined.

2. The system of claim 1 in which different conversion strategies are applied to each portion for which a type is determined, the applied strategy being optimal for converting the portion of the audio voice message to text based on whether the respective portion is determined to be a greeting portion, a message body portion or a tail portion.

3. The system of claim 1 in which the greeting portion, the message body portion and the tail portion of the audio voice message have different quality requirements and a quality assessment sub-system applies the respective standard to each portion for which the type is determined.

4. The system of claim 1 in which the type of the at least one portion is determined at least in part by detecting a boundary between portions of the message corresponding to the greeting portion, the message body portion and/or the tail portion.

5. The system of claim 4 in which the boundary between the greeting portion, the message body portion and/or the tail portion of the audio voice message are detected or inferred at regions in the message where the speech density alters.

6. The system of claim 4 in which the boundary between the greeting portion, the message body portion and/or the tail portion of the audio voice message are detected or inferred at a pause in the message.

7. The system of claim 4 in which the boundary between the greeting portion, the message body portion and/or the tail portion of the audio voice message are detected or inferred as arising at a pre-defined proportion of the message.

8. The system of claim 4 in which a boundary of a greeting portion is inferred at 15% or less of the entire message length.

9. The system of claim 1 in which the audio voice message is intended for a mobile telephone and the audio voice message is converted to text and sent to the mobile telephone.

10. The system of claim 1 in which the audio voice message is intended for an instant messaging service and the audio voice message is converted to text and sent to the instant messaging service for display on a screen.

11. The system of claim 1 in which the audio voice message is intended for a web service and the audio voice message is converted to text and sent to a server for display as part of the web service.

12. The system of claim 1 in which the audio voice message is converted to text format and sent as a text message.

13. The system of claim 1 in which the audio voice message is converted to text format and sent as an email message.

14. The system of claim 1 in which the audio voice message is converted to text format and sent as a note or memo, by email or text, to an originator of the message.

15. The system of claim 1 further comprising a mobile telephone network.

16. The system of claim 1 further comprising a mobile telephone for displaying the text converted from the audio voice message.

17. The system of claim 1 further comprising a computer display screen for displaying the text converted from the audio voice message.

* * * * *